(12) United States Patent
Wang et al.

(10) Patent No.: US 9,990,073 B2
(45) Date of Patent: Jun. 5, 2018

(54) WRITABLE LIQUID CRYSTAL DISPLAY DEVICE AND MANUFACTURING METHOD, DRIVING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Yuxi Wang, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/512,029

(22) PCT Filed: Sep. 8, 2016

(86) PCT No.: PCT/CN2016/098393
§ 371 (c)(1),
(2) Date: Mar. 16, 2017

(87) PCT Pub. No.: WO2017/121137
PCT Pub. Date: Jul. 20, 2017

(65) Prior Publication Data
US 2018/0059847 A1 Mar. 1, 2018

(30) Foreign Application Priority Data
Jan. 14, 2016 (CN) .......................... 2016 1 0022582

(51) Int. Cl.
*G02F 1/1333* (2006.01)
*G06F 3/041* (2006.01)
(Continued)

(52) U.S. Cl.
CPC .............. *G06F 3/0414* (2013.01); *G01L 1/16* (2013.01); *G02F 1/13338* (2013.01);
(Continued)

(58) Field of Classification Search
CPC ....... G02F 1/13394; G02F 2001/13396; G02F 2001/13398
See application file for complete search history.

(56) References Cited

U.S. PATENT DOCUMENTS 5,578,766 A 11/1996 Kondo
9,405,143 B2 * 8/2016 Li ........................ G02F 1/13394
(Continued)

FOREIGN PATENT DOCUMENTS

CN 101952794 A 1/2011
CN 102364413 A 2/2012
(Continued)

OTHER PUBLICATIONS

Office Action in Chinese Application No. 201610022582.2 dated Jun. 7, 2017, with English translation.
(Continued)

*Primary Examiner* — Phu Vu
(74) *Attorney, Agent, or Firm* — Womble Bond Dickinson (US) LLP

(57) ABSTRACT

Embodiments of the present disclosure disclose a writable liquid crystal display device, a manufacturing method and a driving method thereof. The writable liquid crystal display device comprises a first substrate and a second substrate arranged opposite to each other, and a liquid crystal molecule layer located between the first substrate and the second substrate. A plurality of pixel units arranged in an array are disposed on the first substrate, and a pixel electrode is arranged in each pixel unit. A piezoelectric transducer connected with the pixel electrode is further arranged in each pixel unit. A surface plasma resonance metal layer is arranged on the pixel electrode. A pressure transfer structure
(Continued)

is disposed between the first substrate and the second substrate. One end of the pressure transfer structure is in contact with the second substrate, and the other end of the pressure transfer structure is in contact with the piezoelectric transducer.

20 Claims, 4 Drawing Sheets

(51) Int. Cl.
    *G01L 1/16*     (2006.01)
    *G06F 3/0488*     (2013.01)
    *G02F 1/1339*     (2006.01)
    *G02F 1/133*     (2006.01)

(52) U.S. Cl.
    CPC ...... *G02F 1/13394* (2013.01); *G06F 3/04883* (2013.01); *G02F 2001/13312* (2013.01); *G02F 2001/13396* (2013.01)

(56) References Cited

U.S. PATENT DOCUMENTS

| | | |
|---|---|---|
| 2011/0102705 A1 | 5/2011 | Miyazaki et al. |
| 2011/0248941 A1 | 10/2011 | Abdo et al. |
| 2014/0063365 A1* | 3/2014 | Li .................... G02F 1/13394 349/12 |
| 2015/0261367 A1 | 9/2015 | Zhang et al. |

FOREIGN PATENT DOCUMENTS

| | | |
|---|---|---|
| CN | 102364413 A | 2/2012 |
| CN | 103455202 A | 12/2013 |
| CN | 103455202 A | 12/2013 |
| CN | 104407466 A | 3/2015 |
| CN | 104407466 A | 3/2015 |
| CN | 105652488 A | 6/2016 |
| KR | 20140069879 A | 6/2014 |
| KR | 20140069879 A | 6/2014 |

OTHER PUBLICATIONS

International Search Report with English language translation, dated Nov. 28, 2016, International Application No. PCT/CN2016/098393.

* cited by examiner

WRITABLE LIQUID CRYSTAL DISPLAY DEVICE AND MANUFACTURING METHOD, DRIVING METHOD THEREOF

TECHNICAL FIELD

The present disclosure relates to the field of display technology, particularly to a writable liquid crystal display device and a manufacturing method, a driving method thereof.

BACKGROUND

The liquid crystal display device has the characteristics of low electromagnetic radiation, low power consumption, less heat, light weight, and has become the most widely used display device. Exemplarily, the liquid crystal display can be used for viewing videos and consulting documents and books etc.

When the user consults documents and books using the liquid crystal display device, the user has to write generally, for example, writing some annotations or making some marks in the documents or the books. In order to enable the liquid crystal display device to have these functions, the existing writable liquid crystal display device for example includes a liquid crystal display panel, a pressure sensor and an external circuit. In the process of writing by the user, the pressure sensor transmits the sensed signal to the external circuit. The external circuit analyzes and processes the signal to determine the position of the user writing and transmit the particular data signal to the pixel in the liquid crystal display panel corresponding to the position of the user writing, so as to enable this pixel to display certain color, thereby enabling the liquid crystal display panel to display the content written by the user.

SUMMARY

The inventor of the present application finds that, during use of the writable liquid crystal display device, because the data signal is set in advance, the content written by the user can only be displayed by one color, which results in less interest and flexibility of the writable liquid crystal display device, and a poor user experience.

Therefore, it is desired to provide an improved writable liquid crystal display device, and a manufacturing method and a driving method thereof.

According to a first aspect of the present disclosure, a writable liquid crystal display device is provided. The writable liquid crystal display device comprises a first substrate and a second substrate arranged opposite to each other, and a liquid crystal molecule layer located between the first substrate and the second substrate. A plurality of pixel units arranged in an array are disposed on the first substrate, and a pixel electrode is arranged in each pixel unit. A piezoelectric transducer connected with the pixel electrode is further arranged in each pixel unit. A surface plasma resonance metal layer is arranged on the pixel electrode. A pressure transfer structure is disposed between the first substrate and the second substrate. One end of the pressure transfer structure is in contact with the second substrate, and the other end of the pressure transfer structure is in contact with the piezoelectric transducer.

When a user makes writing by use of the above writable liquid crystal display device, the pressure that the user presses the writable liquid crystal display device can be transferred to the piezoelectric transducer through the second substrate and the pressure transfer structure successively. Hence, when the pressures that the user presses the writable liquid crystal display device are different, the electric signals generated by the piezoelectric transducer are different, thereby enabling the electric signals outputted by the piezoelectric transducer to the pixel electrode to be different. Thus, the deflection states of the liquid crystal molecules above the pixel electrode are different so that the dielectric constants of the liquid crystal molecule layer are different. Therefore, when surface plasma resonance occurs at the interface of the liquid crystal molecule layer and the surface plasma resonance metal layer, the absorbed wavelengths of incident light are different, thereby enabling the colors of the light emitted from the writable liquid crystal display device to be different. Hence, when a user makes writing by use of the above writable liquid crystal display device, the color of the written content could be changed as long as the pressure of pressing the writable liquid crystal display device is adjusted. Thus, the use can control the color of the written content in real time, which helps to promoting interest and flexibility of the writable liquid crystal display device and helps to improving user experience.

According to a second aspect of the present disclosure, a driving method of a writable liquid crystal display device is provided. The driving method of the writable liquid crystal display device comprises:

dividing a frame time into a display time period and a writing time period;

applying a data signal on the pixel electrode during the display time period; and outputting an electric signal to the pixel electrode by the piezoelectric transducer during the writing time period.

According to a third aspect of the present disclosure, a manufacturing method of a writable liquid crystal display device is provided. The manufacturing method of the writable liquid crystal display device comprises:

providing a first substrate and a second substrate;

forming a pixel electrode, a piezoelectric transducer and a surface plasma resonance metal layer on the first substrate, the piezoelectric transducer being connected with the pixel electrode;

forming a pressure transfer structure on the first substrate or the second substrate;

dripping liquid crystals on the first substrate or the second substrate, and assembling the first substrate and the second substrate, so as to enable one end of the pressure transfer structure to be in contact with the second substrate, and the other end of the pressure transfer structure to be in contact with the piezoelectric transducer.

BRIEF DESCRIPTION OF THE DRAWINGS

In order to explain embodiments of the present disclosure more clearly, next, the drawings to be used in description of the embodiments will be introduced briefly. Apparently, the drawings described below only schematically illustrate some embodiments of the present disclosure. For the ordinary skilled person in the art, other drawings can also be obtained from these drawings without paying any creative work.

DETAILED DESCRIPTION OF THE DISCLOSURE

Explanations of Reference Signs

1—first substrate; 11—pixel electrode; 12—piezoelectric transducer; 121—first electrode layer; 122—piezoelectric layer; 123—second electrode layer; 13—surface plasma resonance metal layer; 14—electrode line; 15—gate line; 16—data line; 17—thin film transistor; 2—second substrate; 21—black matrix; 22—color filter layer; 23—common electrode; 3—liquid crystal molecule layer; 4—pressure transfer structure Next, the technical solutions in embodiments of the present disclosure will be described clearly and completely with reference to the drawings according to embodiments of the present disclosure. Apparently, the embodiments described are only a part of rather than all of the embodiments of the present disclosure. Based on the embodiments in the present disclosure, other embodiments obtained by the ordinary skilled person in the art, without paying any creative work, all fall within the protection scope of the present disclosure.

Figure 1:
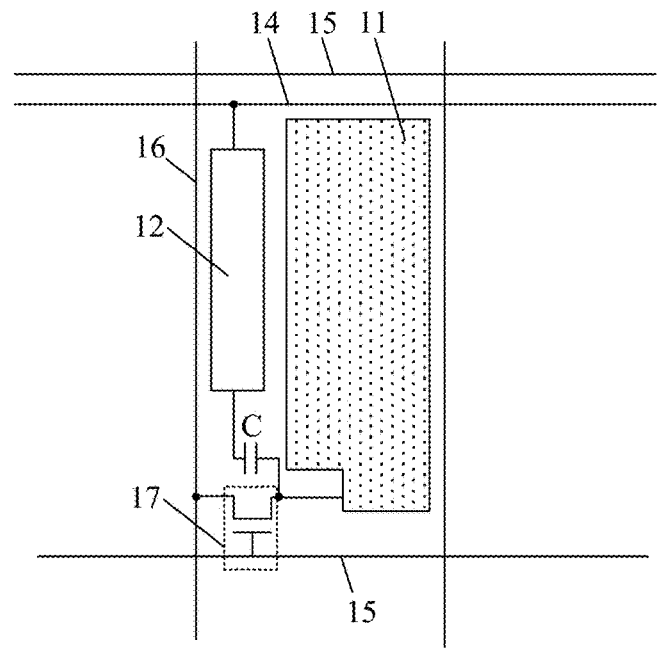
FIG. 1 is a planar schematic view of a first substrate according to an embodiment of the present disclosure.
Figure 2:
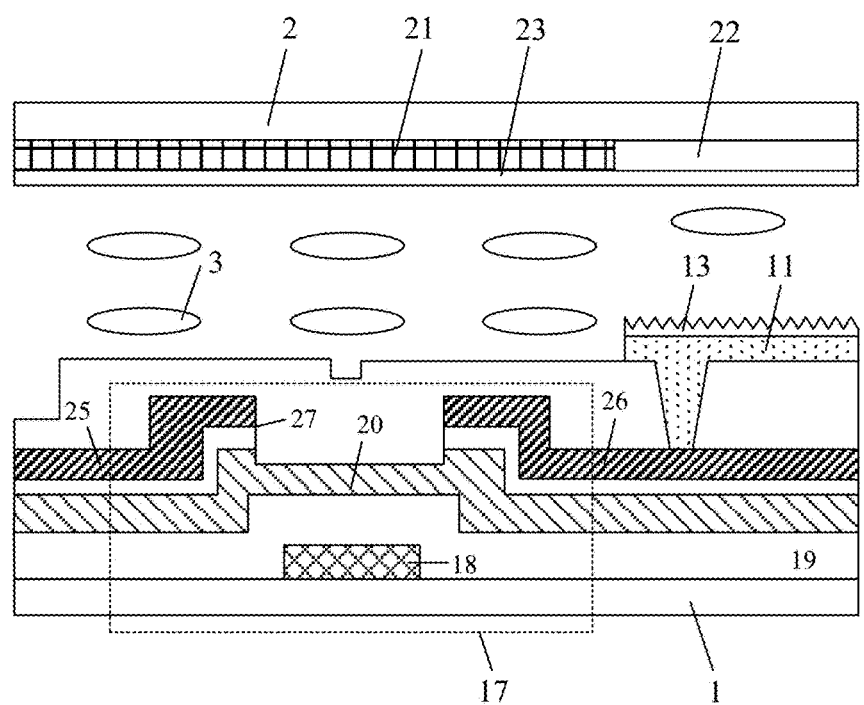
FIG. 2 is a sectional schematic view of a writable liquid crystal display device according to an embodiment of the present disclosure at a position where a thin film transistor locates.
Figure 3:
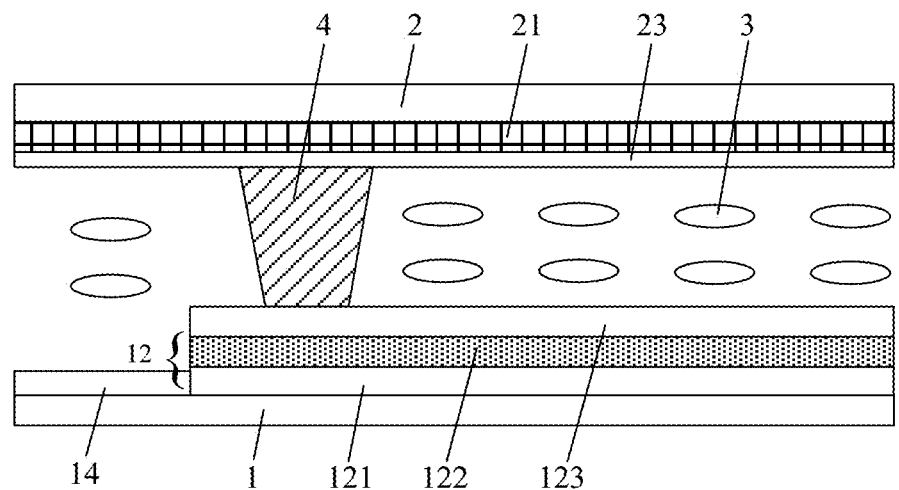
FIG. 3 is a sectional schematic view of a writable liquid crystal display device according to an embodiment of the present disclosure at a position where a piezoelectric transducer locates.

An embodiment of the present disclosure provides a writable liquid crystal display device, as shown in FIG. 1, FIG. 2 and FIG. 3. The writable liquid crystal display device comprises a first substrate 1 and a second substrate 2 arranged opposite to each other, and a liquid crystal molecule layer 3 located between the first substrate 1 and the second substrate 2. A plurality of pixel units arranged in an array are disposed on the first substrate 1, and a pixel electrode 11 is arranged in each pixel unit. A piezoelectric transducer 12 is further arranged in each pixel unit, and the piezoelectric transducer 12 is connected with the pixel electrode 11. A surface plasma resonance metal layer 13 is arranged on the pixel electrode 11. A pressure transfer structure 4 is disposed between the first substrate 1 and the second substrate 2. One end of the pressure transfer structure 4 is in contact with the second substrate 2, and the other end of the pressure transfer structure 4 is in contact with the piezoelectric transducer 12.

It should be noted that the above "contact" can be direct contact and can also be indirect contact. Exemplarily, when a passivation layer is also arranged on the piezoelectric transducer 12, the other end of the pressure transfer structure 4 is in direct contact of the passivation layer on the piezoelectric transducer 12. The other end of the pressure transfer structure 4 is in indirect contact with the piezoelectric transducer 12.

Optionally, the pressure transfer structure 4 in an embodiment of the present disclosure is a columnar spacer. The columnar spacer has both the functions of maintaining the gap between the first substrate 1 and the second substrate 2 and transferring the pressure to the piezoelectric transducer 12, which is benefit for simplifying the manufacturing method of the writable liquid crystal display device. The columnar spacer can be formed on the first substrate 1 so that the free end of the columnar spacer is in contact with the second substrate 2. The columnar spacer can also be formed on the second substrate 2 so that the free end of the columnar spacer is in contact with the piezoelectric transducer 12, which will not be defined in embodiments of the present disclosure.

When a user makes writing by use of the above writable liquid crystal display device, the pressure that the user presses the writable liquid crystal display device can be transferred to the piezoelectric transducer 12 through the second substrate 2 and the pressure transfer structure 4 successively. Hence, when the pressures that the user presses the writable liquid crystal display device are different, the electric signals generated by the piezoelectric transducer 12 are different, thereby enabling the electric signals outputted by the piezoelectric transducer 12 to the pixel electrode 11 to be different. Thus, the deflection states of the liquid crystal molecules above the pixel electrode 11 are different so that the dielectric constants of the liquid crystal molecule layer 3 are different. Therefore, when surface plasma resonance occurs at the interface of the liquid crystal molecule layer 3 and the surface plasma resonance metal layer 13, the absorbed wavelengths of incident light are different, thereby enabling the colors of the light emitted from the writable liquid crystal display device to be different. Hence, when a user makes writing by use of the above writable liquid crystal display device, the color of the written content could be changed as long as the pressure of pressing the writable liquid crystal display device is adjusted. Thus, the use can control the color of the written content in real time, which helps to promoting interest and flexibility of the writable liquid crystal display device and helps to improving user experience.

More specifically, the surface plasma resonance is a physical phenomenon. The surface plasma resonance effect refers to the phenomenon of generating resonance when the horizontal wave vector of the incident light is same as the wave vector of the surface plasma wave at the metal-dielectric interface. If the refractive index of the dielectric is complex number, changing the real part of the refractive index will result in change of the surface plasma resonance wavelength (change of the color can be achieved). When the resonance strength is not changed, the larger the refractive index is, the longer the resonance wavelength will be. Changing the imaginary part of the refractive index will result in change of the surface plasma resonance strength (change of the brightness can be achieved). When the resonance wavelength is not changed, the larger the imaginary part is, the severe the attenuation will be.

In the event that there are liquid crystals at the peripheral of the surface plasma resonance metal layer, under different liquid crystal orientations, the dielectric constant of the liquid crystal is different from that of the surface plasma resonance metal layer, such that the surface plasma resonance metal layer can absorb incident light of different wavelengths, so as to exhibit different colors of emitted light. That is to say, the liquid crystal for example can serve as a transparent dielectric layer before light impinges on the surface plasma resonance metal layer. The orientation of the liquid crystal is controllable in response to electricity, and the voltage exactly comes from the piezoelectric transducer. It converts degree of the external force into magnitude of the voltage, so as to control the orientation of the liquid crystal, and enable the light to present different polarization states or phases after passing through the liquid crystal layer and therefore present different colors after reflection by the surface plasma resonance metal layer. Therefore, each pixel unit can display colors by use of the surface plasma resonance principle. The color of the pixel can be controlled by the voltage applied by the pixel electrode. The pressure applied to a pixel unit of the writable liquid crystal display device when the user writes can be converted into a voltage applied by the pixel electrode via the piezoelectric transducer in the pixel unit.

In addition, because the piezoelectric transducer 12 in each pixel unit of the writable liquid crystal display device can be connected with the pixel electrode 11 in the pixel unit directly, so as to output the electric signal generated by the piezoelectric transducer 12 to the pixel electrode 11 directly, long-distance transmission and complex processing of the electric signal can be avoided. Therefore, compared to the prior art, the writable liquid crystal display device further has the advantages of a simple structure and a simple driving method.

Next, the specific structures of the first substrate 1 and the second substrate 2 according to an embodiment of the present disclosure will be described in detail.

Figure 4:
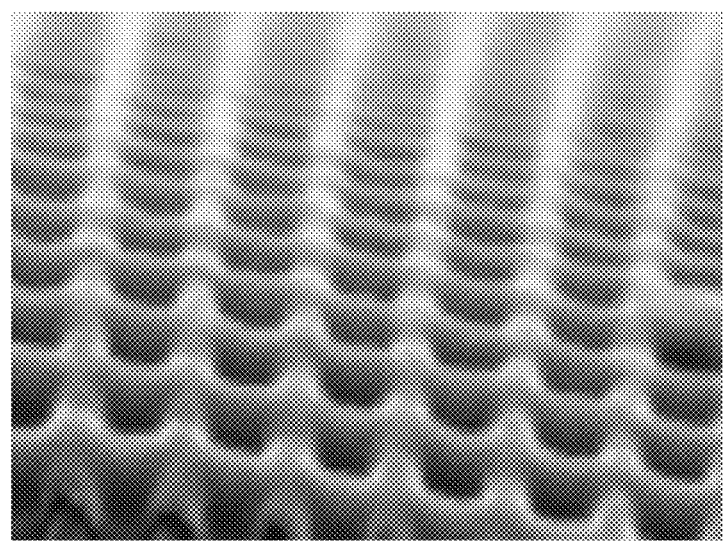
FIG. 4 is a scanning electron micrograph of a first type of surface plasma resonance metal layer according to an embodiment of the present disclosure.
Figure 5:
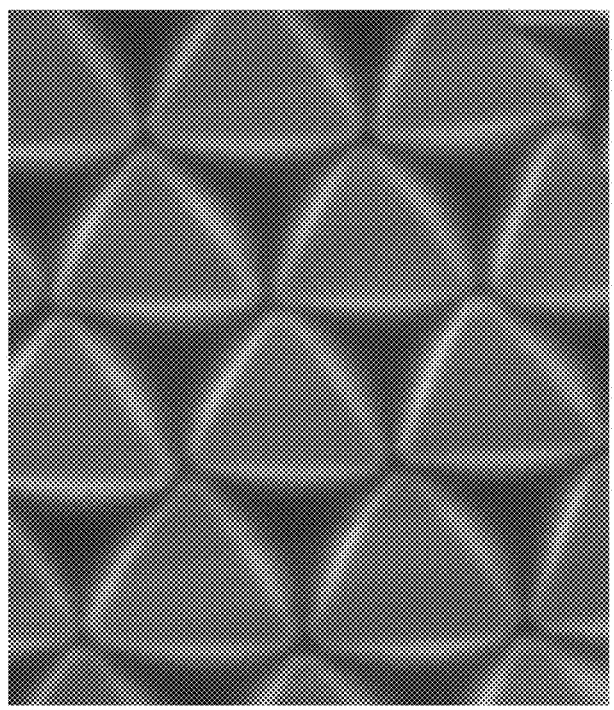
FIG. 5 is a scanning electron micrograph of a second type of surface plasma resonance metal layer according to an embodiment of the present disclosure.

Optionally, as shown in FIG. 4 and FIG. 5, the surface plasma resonance metal layer 13 on the first substrate 1 comprises a body and a plurality of nanostructures regularly arranged on the body. The materials of the body and the plurality of nanostructures are all aluminum, silver or gold. Exemplarily, as shown in FIG. 4, the plurality of nanostructures can be a plurality of nanowires, and the plurality of nanowires are in a crisscrossed arrangement. In view of the difficulty level of the manufacturing method of the nanowires, according to an embodiment of the present disclosure, the diameter of the nanowire is greater than or equal to 40 nm, and less than 1 μm. Alternatively, as shown in FIG. 5, the plurality of nanostructures are a plurality of nanoparticles with triangle cross sections, and the plurality of nanoparticles are arranged in an array. Similarly, in view of the difficulty level of the manufacturing method of the nanoparticles, according to one embodiment of the present disclosure, a side length of the nanoparticle is greater than or equal to 40 nm, and less than 1 μm. In addition, in overall consideration of factors such as the difficulty level of the manufacturing method of the surface plasma resonance metal layer 13 and the thickness of the writable liquid crystal display device, according to an embodiment of the present disclosure, a thickness of the surface plasma resonance metal layer is 30 nm to 10 μm.

It should be noted that the structure of the surface plasma resonance metal layer 13 is not limited to the above, the arrangement and the shape of the nanostructures thereon are not limited to the above either, and the size of the nanostructure is not limited to the above either. The skilled person in the art can make selection based on actual needs.

Optionally, as shown in FIG. 3, according to an embodiment of the present disclosure, the piezoelectric transducer 12 can comprise a first electrode layer 121, a piezoelectric layer 122 and a second electrode layer 123 arranged in stack. An electrode line 14 is further disposed on the first substrate 1. The first electrode layer 121 is connected with the electrode line 14. The electrode line 14 is adapted to apply a reference voltage to the first electrode layer 121. The second electrode layer 123 is connected with the pixel electrode 11. According to one embodiment of the present disclosure, the first electrode layer 121, the piezoelectric layer 122 and the second electrode layer 123 have a relatively high light transmittance, such that the setting of the piezoelectric transducer 12 will not reduce the aperture ratio of the first substrate 1 greatly. Exemplarily, the material of the piezoelectric layer 122 can be lead/manganese titanate or nano zinc oxide. In overall consideration of factors such as the difficulty level of the manufacturing method of the piezoelectric layer 122, magnitude of the electric signal that can be generated and the thickness of the writable liquid crystal display device, according to an embodiment of the present disclosure, the thickness of the piezoelectric layer 122 can be 10 nm to 5 μm. The materials of the first electrode layer 121 and the second electrode layer 123 can be both indium tin oxide. Because the material of the pixel electrode 11 is generally indium tin oxide, the second electrode layer 123 and the pixel electrode 11 can be formed simultaneously, so as to simplify the manufacturing method of the writable liquid crystal display device and achieve stable connection between the second electrode layer 123 and the pixel electrode 11. In overall consideration of the factors such as the difficulty level of the manufacturing method of the two electrode layers, the size of the resistance and the thickness of the writable liquid crystal display device, according to an embodiment of the present disclosure, the thicknesses of the first electrode layer 121 and the second electrode layer 123 are both 30 nm to 50 nm.

It should be noted that the structure of the piezoelectric transducer 12 is not limited to the above, the materials and the thicknesses of respective layer structures comprised by it are not limited to the above either. The skilled person in the art can make selection based on actual needs.

Further, in the event that the electrode line 14 is connected with the first electrode layer 121 and the pixel electrode 11 is connected with the second electrode layer 123, when the signal applied on the electrode line 14 is a common voltage signal, the signal on the first electrode layer 121 is a common voltage signal. Hence, when the same pressure acts on the piezoelectric transducer 12, the electric signal transmitted to the pixel electrode 11 through the second electrode layer 123 is relatively large. Hence, according to an embodiment of the present disclosure, the signal applied on the electrode line 14 is a common voltage signal. According to another embodiment of the present disclosure, a plurality of gate lines 15 are further arranged on the first substrate 1. The electrode line 14 for example can be located between two adjacent rows of pixel units, such that the setting of the electrode line 14 will not reduce the aperture ratio of the first substrate 1. The electrode line 14 and the gate line 15 can be arranged in the same layer and made of the same material, and the electrode line 14 and the gate line 15 can be formed simultaneously, which is benefit for simplifying the manufacturing method of the writable liquid crystal display device.

Optionally, as shown in FIG. 1, according to another embodiment of the present disclosure, a capacitor C can be further arranged in each pixel unit. One plate of the capacitor C is connected with the pixel electrode 11, and the other plate of the capacitor C is connected with the piezoelectric transducer 12. The electric signal generated by the piezoelectric transducer 12 can charge the capacitor C. When the user stops pressing, the capacitor C can discharge so as to maintain normal display of the content written by the user, which is benefit for lengthening the display time of the content written by the user.

As shown in FIG. 1, according to an embodiment of the present disclosure, a data line 16 can be further arranged on the first substrate 1. The data line 16 and the gate line 15 are in a crisscrossed arrangement. The gate line 15 and the data line 16 define a pixel unit, and a thin film transistor 17 is further arranged in the pixel unit. As shown in FIG. 2, the thin film transistor 17 comprises a gate 18, a gate insulating layer 19, an active layer 20, a source 25 and a drain 26. The gate 18 of the thin film transistor 17 is connected with the gate line 15, the source 25 of the thin film transistor is connected with the data line 16, and the drain 26 of the thin film transistor is connected with the pixel electrode 11. The thin film transistor can be a top gate type thin film transistor or a bottom gate type thin film transistor, which will not be defined in embodiments of the present disclosure. In addition, the thin film transistor 17 can further comprise Ohmic contact layers 27 located between the active layer 20 and the source 25 and between the active layer 20 and the drain 26, so as to improve electrical connection performance between the active layer and the source and between the active layer and the drain. According to another embodiment of the present disclosure, the display mode of the writable liquid crystal display device can be advanced super dimension switch (ADS) mode. When the display mode of the writable liquid crystal display device is the ADS mode, a common electrode is further arranged on the first substrate 1, and either of the common electrode and the pixel electrode that is closer to the liquid crystal molecule layer 3 has a slit structure or is a strip electrode.

Certainly, the structures on the first substrate 1 are not limited to the above, the skilled person in the art can make selection based on actual needs.

As shown in FIG. 2, according to an embodiment of the present disclosure, a black matrix 21 and a color filter layer 22 can be arranged on the second substrate 2. According to another embodiment of the present disclosure, the display mode of the writable liquid crystal display device can be twisted nematic (TN) mode. When the display mode of the writable liquid crystal display device is the TN mode, a plate-shaped common electrode 23 is further arranged on the second substrate 2. The common electrode 23 is located on a side of the black matrix 21 and the color filter layer 22 facing towards the liquid crystal molecule layer 3. Certainly, the structures on the second substrate 2 are not limited to the above, the skilled person in the art can make selection based on actual needs.

In addition, the writable liquid crystal display device according to an embodiment of the present disclosure can be a transmission type display is device or a reflection type display device. When the writable liquid crystal display device is a transmission type display device or a reflection type display device, the corresponding known structures can be further arranged on the first substrate 1 and the second substrate 2, which will not be repeated in embodiments of the present disclosure. When the writable liquid crystal display device is a reflection type display device (e.g., an electro-wetting display device), it can make use of the ambient light for display, and does not have to arrange a backlight module, so as to enable the power consumption of the writable liquid crystal display device to be lower.

Figure 6:
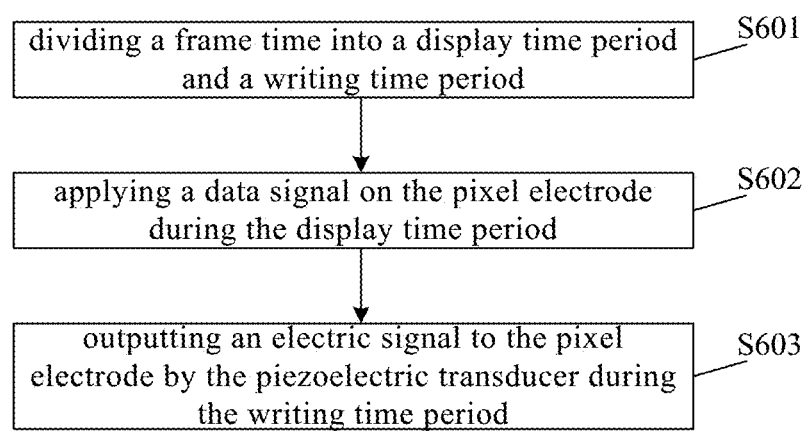
FIG. 6 is a flow chart of a driving method of a writable liquid crystal display device according to an embodiment of the present disclosure.

Embodiments of the present disclosure further provide a driving method of a writable liquid crystal display device. The driving method is adapted to drive the above writable liquid crystal display device. As shown in FIG. 6, the driving method comprises:

Step S601: dividing a frame time into a display time period and a writing time period. Exemplarily, a frame time is 20 µs. The display time period is 16.7 µs. Then, the refresh frequency of the display image is 60 Hz. The writing time period is 3.3 µs.

Step S602: applying a data signal on the pixel electrode during the display time period. Exemplarily, during the display time period, the gate lines are turned on row by row, so as to turn on the thin film transistors in the pixel units row by row, thereby applying the data signal transmitted on the data line to the pixel electrode.

Step S603: outputting an electric signal to the pixel electrode by the piezoelectric transducer during the writing time period. Exemplarily, during the writing time period, the pressure that the user presses on the writable liquid crystal display device is applied on the piezoelectric transducer through the second substrate and the pressure transfer structure successively. The electric signal generated by the piezoelectric transducer under the effect of this pressure is outputted to the pixel electrode.

In order to facilitate the skilled person in the art to understand and carry out, next, an exemplary driving method of the writable liquid crystal display device is provided. It will be described below by taking the example that a frame time is 20 µs.

During the display time period, i.e., the first 16.7 µs, the gate lines in the writable liquid crystal display device are turned on row by row, and the thin film transistors in the pixel units are turned on row by row. The data lines apply data signals to the pixel electrodes in the pixel units row by row so as to enable the pixel units to display images.

During the writing time period, i.e., the last 3.3 µs, the gate lines in the writable liquid crystal display device are all turned off. The electrode lines are all applied with common voltage signals, so that the first electrode layers of all piezoelectric transducers are applied with the common voltage signals. The user applies a pressure on the writable liquid crystal display device. The pressure acts on the piezoelectric layer of the piezoelectric transducer through the second substrate and the pressure transfer structure successively. The electric signal generated by the piezoelectric layer is outputted to the pixel electrode through the second electrode layer, so as to enable the pixel unit to display the content written by the user.

Figure 7:
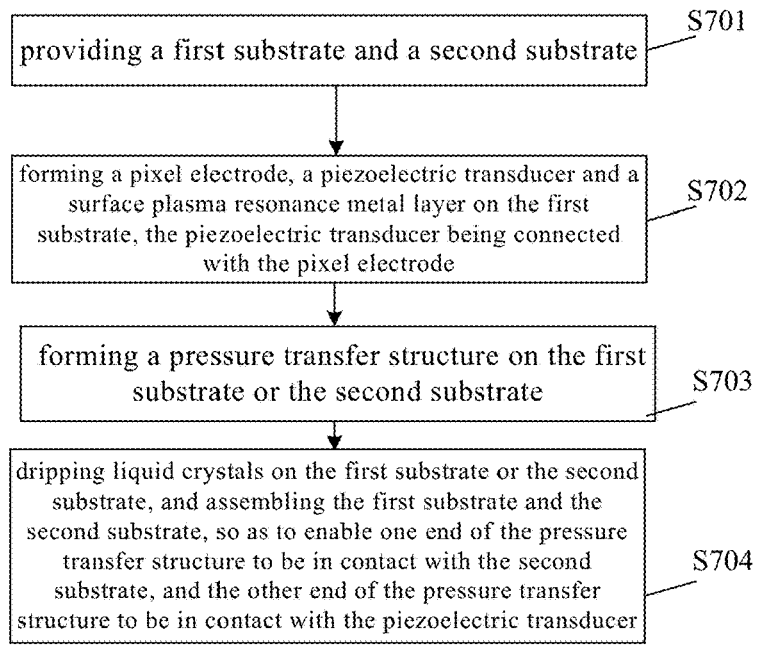
FIG. 7 is a flow chart of a manufacturing method of a writable liquid crystal display device according to an embodiment of the present disclosure.

In addition, embodiments of the present disclosure further provide a manufacturing method of a writable liquid crystal display device. The manufacturing method is adapted to manufacture the above writable liquid crystal display device. As shown in FIG. 7, the manufacturing method comprises:

Step S701: providing a first substrate and a second substrate.

Step S702: forming a pixel electrode, a piezoelectric transducer and a surface plasma resonance metal layer on the first substrate, the piezoelectric transducer being connected with the pixel electrode. The step S702 can be carried out in various ways, the skilled person in the art can make selection based on actual needs. Detailed explanation will be made in the subsequent description of embodiments of the present disclosure.

Step S703: forming a pressure transfer structure on the first substrate or the second substrate. Exemplarily, the pressure transfer structure can be a columnar spacer. The step of forming the pressure transfer structure on the first substrate or the second substrate comprises: coating transparent photosensitive resin on the first substrate or the second substrate, and exposing and developing the transparent photosensitive resin by a mask plate.

Step S704: dripping liquid crystals on the first substrate or the second substrate, and assembling the first substrate and the second substrate, so as to enable one end of the pressure transfer structure to be in contact with the second substrate, and the other end of the pressure transfer structure to be in contact with the piezoelectric transducer.

Exemplarily, the pixel electrode, the piezoelectric transducer and the surface plasma resonance metal layer on the first substrate can have the structures as shown in FIG. 1, FIG. 2 and FIG. 3. Prior to the step S702 (i.e., forming the pixel electrode, the piezoelectric transducer and the surface plasma resonance metal layer on the first substrate), the manufacturing method of the writable liquid crystal display device further comprises: forming a gate metal layer on the first substrate, and forming a pattern comprising a gate line and an electrode line through patterning process.

Figure 8:
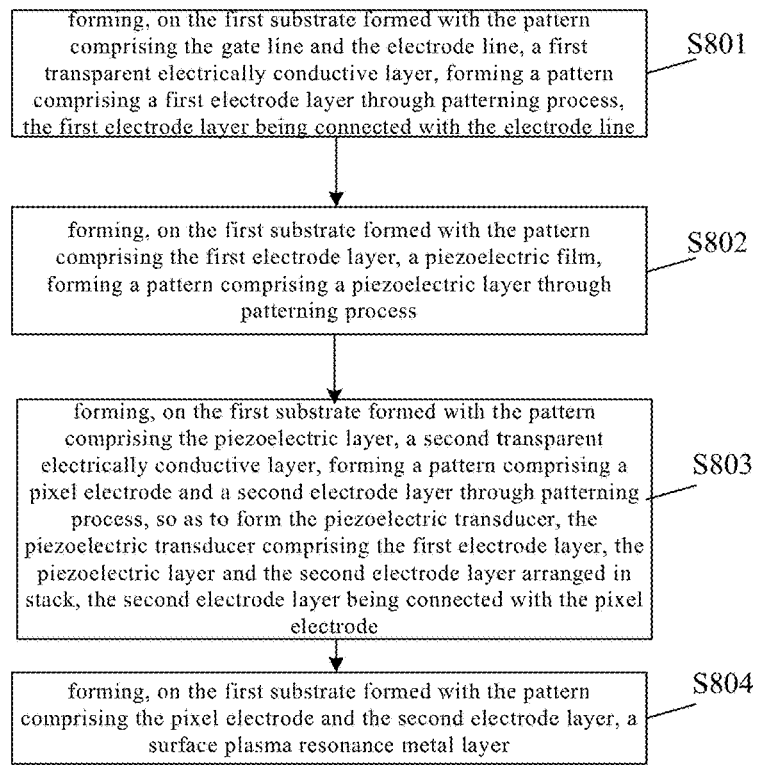
FIG. 8 is a specific flow chart of step S702 in FIG. 7 according to an embodiment of the present disclosure.

Further, as shown in FIG. 8, the step S702 (i.e., the step of forming the pixel electrode, the piezoelectric transducer and the surface plasma resonance metal layer on the first substrate) specifically comprises:

Step S801: forming, on the first substrate formed with the pattern comprising the gate line and the electrode line, a first transparent electrically conductive layer, and forming a pattern comprising a first electrode layer through patterning process, the first electrode layer being connected with the electrode line. It should be noted that except otherwise defined, the "patterning process" in embodiments of the present disclosure for example includes steps of coating photoresist, masking by a mask plate, exposing, developing, etching and stripping the photoresist.

Step S802: forming, on the first substrate formed with the pattern comprising the first electrode layer, a piezoelectric film, and forming a pattern comprising a piezoelectric layer through patterning process;

Step S803: forming, on the first substrate formed with the pattern comprising the piezoelectric layer, a second transparent electrically conductive layer, and forming a pattern comprising a pixel electrode and a second electrode layer through patterning process, so as to form the piezoelectric transducer. The piezoelectric transducer comprises the first electrode layer, the piezoelectric layer and the second electrode layer arranged in stack. The second electrode layer is connected with the pixel electrode.

Step S804: forming, on the first substrate formed with the pattern comprising the pixel electrode and the second electrode layer, a surface plasma resonance metal layer. Exemplarily, the surface plasma resonance metal layer can be formed by nanoimprinting technology In addition, other structures can also be arranged on the first substrate and the second substrate. The skilled person in the art can obtain the manufacturing steps of other structures by making reference to the prior art, which will not be repeated here.

What are stated above are only specific embodiments of the present disclosure, however, the protection scope of the present disclosure is not limited to this. Any modification or replacement that can be easily conceived by the skilled person in the art familiar with the present technical field within the technical scope disclosed by the present disclosure shall be encompassed within the protection scope of the present disclosure. Therefore, the protection scope of the present disclosure should be subject to the protection scopes of the attached claims.

The invention claimed is:

1. A writable liquid crystal display device, comprising:
a first substrate and a second substrate arranged opposite to each other; and
a liquid crystal molecule layer located between the first substrate and the second substrate,
wherein a plurality of pixel units arranged in an array are disposed on the first substrate, and a pixel electrode is arranged in each pixel unit, and
wherein a piezoelectric transducer connected with the pixel electrode is further arranged in each pixel unit, a surface plasma resonance metal layer is arranged on the pixel electrode, and a pressure transfer structure is disposed between the first substrate and the second substrate, one end of the pressure transfer structure being in contact with the second substrate, and the other end of the pressure transfer structure being in contact with the piezoelectric transducer.

2. The writable liquid crystal display device according to claim 1, wherein the surface plasma resonance metal layer comprises a body and a plurality of nanostructures regularly arranged on the body, and materials of the body and the plurality of nanostructures are all aluminum, silver or gold.

3. The writable liquid crystal display device according to claim 2, wherein the plurality of nanostructures are a plurality of nanowires, and the plurality of nanowires are in a crisscrossed arrangement.

4. The writable liquid crystal display device according to claim 2, wherein the plurality of nanostructures are a plurality of nanoparticles with triangle cross sections, and the plurality of nanoparticles are arranged in an array.

5. The writable liquid crystal display device according to claim 3, wherein a diameter of the nanowire is greater than or equal to 40nm, and less than 1μm.

6. The writable liquid crystal display device according to claim 4, wherein a side length of the nanoparticle is greater than or equal to 40nm, and less than 1μm.

7. The writable liquid crystal display device according to claim 2, wherein a thickness of the surface plasma resonance metal layer is 30nm to 10μm.

8. The writable liquid crystal display device according to claim 1, wherein the piezoelectric transducer comprises a first electrode layer, a piezoelectric layer and a second electrode layer arranged in stack, and an electrode line for applying a reference voltage to the first electrode layer is further disposed on the first substrate, and wherein the first electrode layer is connected with the electrode line, and the second electrode layer is connected with the pixel electrode.

9. The writable liquid crystal display device according to claim 8, wherein a material of the piezoelectric layer is lead/manganese titanate or nano zinc oxide.

10. The writable liquid crystal display device according to claim 9, wherein a thickness of the piezoelectric layer is 10nm to 5μm.

11. The writable liquid crystal display device according to claim 8, wherein materials of the first electrode layer and the second electrode layer are both indium tin oxide.

12. The writable liquid crystal display device according to claim 11, wherein thicknesses of the first electrode layer and the second electrode layer are both 30nm to 50nm.

13. The writable liquid crystal display device according to claim 8, wherein a signal applied on the electrode line is a common voltage signal.

14. The writable liquid crystal display device according to claim 8, wherein a plurality of gate lines are further disposed on the first substrate, the electrode line is located between two adjacent rows of pixel units, and the electrode line and the gate line are arranged in a same layer and are made of a same material.

15. The writable liquid crystal display device according to claim 1, wherein a capacitor is further arranged in each pixel unit, and wherein one plate of the capacitor is connected with the pixel electrode, and the other plate of the capacitor is connected with the piezoelectric transducer.

16. The writable liquid crystal display device according to claim 1, wherein the pressure transfer structure is a columnar spacer.

17. A driving method of a writable liquid crystal display device, for driving the writable liquid crystal display device according to claim 1, the driving method comprising:
dividing a frame time into a display time period and a writing time period;
applying a data signal on the pixel electrode during the display time period; and
outputting an electric signal to the pixel electrode by the piezoelectric transducer during the writing time period.

18. A manufacturing method of a writable liquid crystal display device, for manufacturing the writable liquid crystal display device according to claim 1, the manufacturing method comprising:
providing a first substrate and a second substrate;
forming a pixel electrode, a piezoelectric transducer and a surface plasma resonance metal layer on the first substrate, the piezoelectric transducer being connected with the pixel electrode;
forming a pressure transfer structure on the first substrate or the second substrate;
dripping liquid crystals on the first substrate or the second substrate, and assembling the first substrate and the second substrate, so as to enable one end of the pressure transfer structure to be in contact with the second substrate, and the other end of the pressure transfer structure to be in contact with the piezoelectric transducer.

19. The manufacturing method of a writable liquid crystal display device according to claim 18, wherein, prior to forming the pixel electrode, the piezoelectric transducer and the surface plasma resonance metal layer on the first substrate, the manufacturing method further comprises:
forming a gate metal layer on the first substrate, and forming a pattern comprising a gate line and an electrode line through patterning process, and
wherein the step of forming the pixel electrode, the piezoelectric transducer and the surface plasma resonance metal layer on the first substrate comprises:
forming, on the first substrate formed with the pattern comprising the gate line and the electrode line, a first transparent electrically conductive layer, forming a pattern comprising a first electrode layer through patterning process, the first electrode layer being connected with the electrode line;
forming, on the first substrate formed with the pattern comprising the first electrode layer, a piezoelectric film, forming a pattern comprising a piezoelectric layer through patterning process;
forming, on the first substrate formed with the pattern comprising the piezoelectric layer, a second transparent electrically conductive layer, forming a pattern comprising a pixel electrode and a second electrode layer through patterning process, so as to form the piezoelectric transducer, the piezoelectric transducer comprising the first electrode layer, the piezoelectric layer and the second electrode layer arranged in stack, the second electrode layer being connected with the pixel electrode; and
forming, on the first substrate formed with the pattern comprising the pixel electrode and the second electrode layer, a surface plasma resonance metal layer.

20. The manufacturing method of a writable liquid crystal display device according to claim 19, wherein the step of forming the surface plasma resonance metal layer comprises:
forming the surface plasma resonance metal layer by nanoimprinting technology.

* * * * *